(12) United States Patent
Saitou et al.

(10) Patent No.: US 7,224,494 B2
(45) Date of Patent: May 29, 2007

(54) IMAGE READING APPARATUS, ITS LIGHT SOURCE, AND SHADING CORRECTING APPARATUS

(75) Inventors: Tomihisa Saitou, Osaka (JP); Kouzou Fujino, Osaka (JP)

(73) Assignee: Nippon Sheet Glass Company, Limited, Tokyo (JP)

(*) Notice: Subject to any disclaimer, the term of this patent is extended or adjusted under 35 U.S.C. 154(b) by 781 days.

(21) Appl. No.: 09/992,869

(22) Filed: Nov. 14, 2001

(65) Prior Publication Data

US 2002/0057846 A1 May 16, 2002

(30) Foreign Application Priority Data

| Nov. 15, 2000 | (JP) | ............................. 2000-347755 |
| Jan. 15, 2001 | (JP) | ............................. 2001-006176 |
| Jul. 6, 2001 | (JP) | ............................. 2001-206325 |
| Sep. 17, 2001 | (JP) | ............................. 2001-281120 |

(51) Int. Cl.
*H04N 1/04* (2006.01)

(52) U.S. Cl. ...................... 358/474; 358/475; 358/509; 359/599; 359/831

(58) Field of Classification Search ................ 358/474, 358/475, 509, 497, 484, 513, 514; 359/599, 359/831

See application file for complete search history.

(56) References Cited

U.S. PATENT DOCUMENTS

| 5,921,651 A  * | 7/1999  | Ishikawa ...................... 362/31 |
| 6,084,983 A  * | 7/2000  | Yamamoto ................... 382/167 |
| 6,172,745 B1 * | 1/2001  | Voser et al. ................... 356/71 |
| 6,204,938 B1 * | 3/2001  | Horiuchi et al. ............. 358/484 |
| 6,239,421 B1 * | 5/2001  | Nagata et al. ............ 250/208.1 |
| 6,295,141 B1 * | 9/2001  | Ogura et al. ................ 358/475 |
| 6,345,899 B1 * | 2/2002  | Ohkawa et al. ............... 362/31 |
| 6,357,903 B1 * | 3/2002  | Furusawa et al. ........... 362/555 |
| 6,462,841 B1 * | 10/2002 | Tabata et al. ................ 358/475 |
| 6,468,827 B1 * | 10/2002 | Fujimoto et al. ............. 438/60 |
| 6,660,987 B2 * | 12/2003 | Koshimizu ............... 250/208.1 |
| 2003/0043351 A1 * | 3/2003 | Ochi et al. ..................... 355/18 |

* cited by examiner

*Primary Examiner*—Aung Moe
*Assistant Examiner*—Negussie Worku
(74) *Attorney, Agent, or Firm*—RatnerPrestia

(57) ABSTRACT

In an image reading apparatus using a contact image sensor, an area light source for reading an image from a film original is provided. The area light source has a light guide plate and an LED device in the center of a side surface on the shorter side of the plate. In the LED device, red-, green-, and blue-LED chips are mounted on the same package and red-, green-, and blue-light are switched and lit. A white bottom plate covers the bottom surface of the light guide plate and a white case frame covers the four side surfaces. A scattering sheet is adhered to the upper surface of the white case frame, that is, a light emitting surface. On the rear surface of the light guide plate, light scatterers are formed by screen printing so that a specific pattern is drawn by high-reflectance white ink.

30 Claims, 17 Drawing Sheets

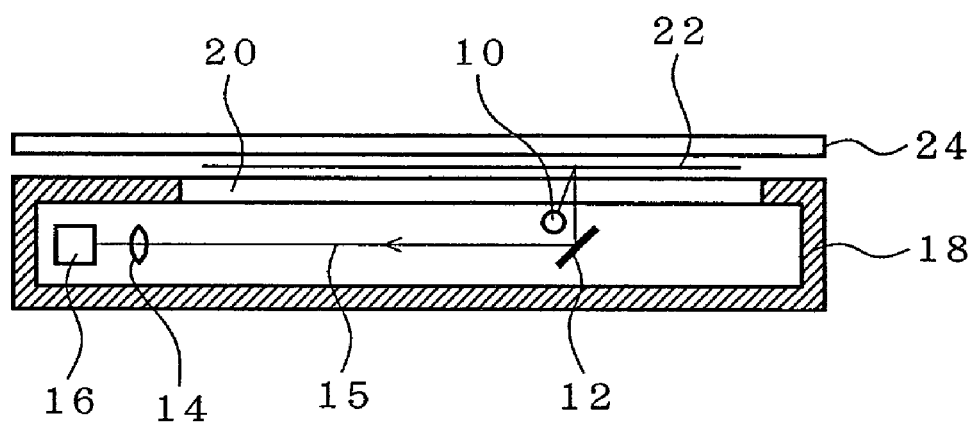
F I G. 1

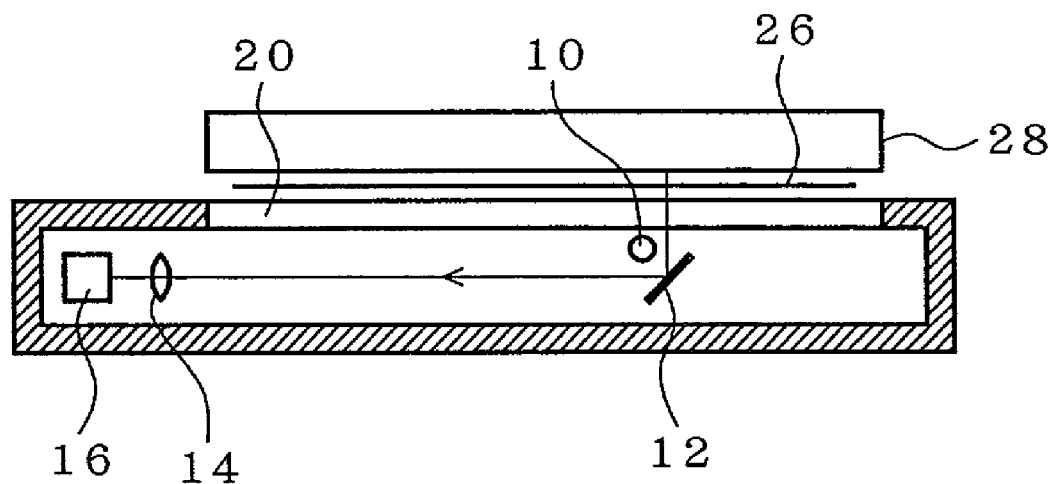
F I G. 2 A
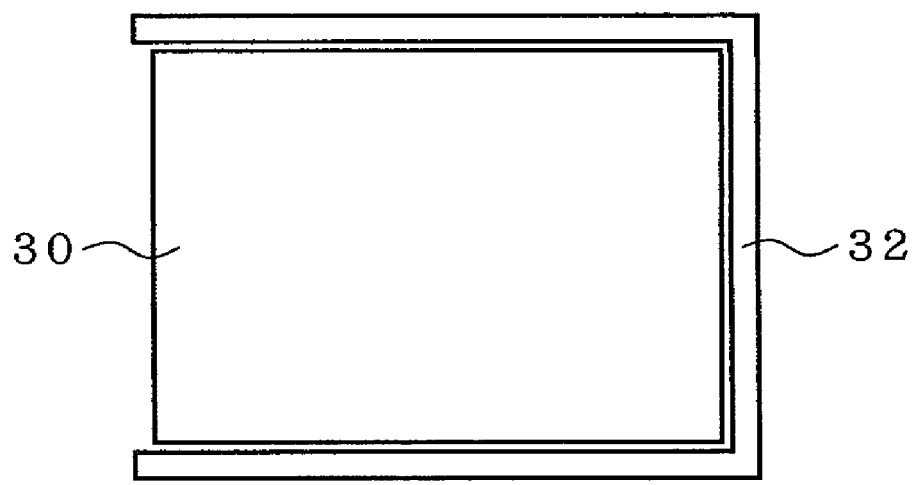
F I G. 2 B

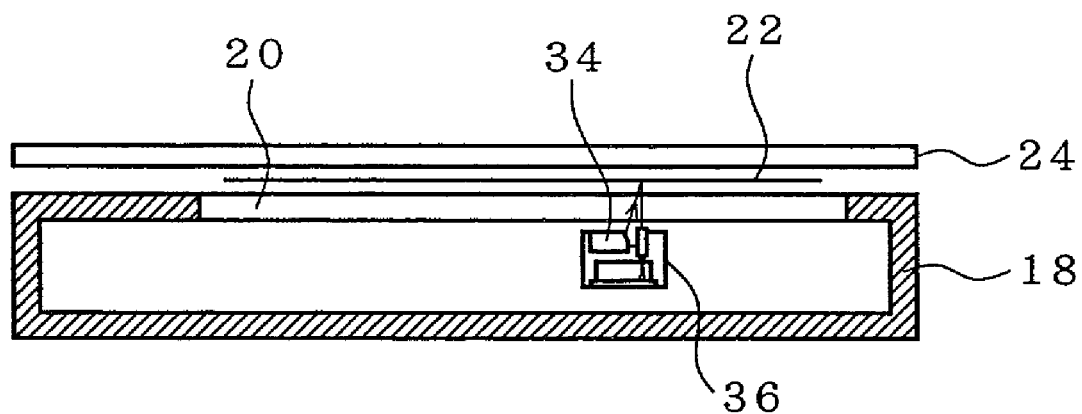
F I G. 3
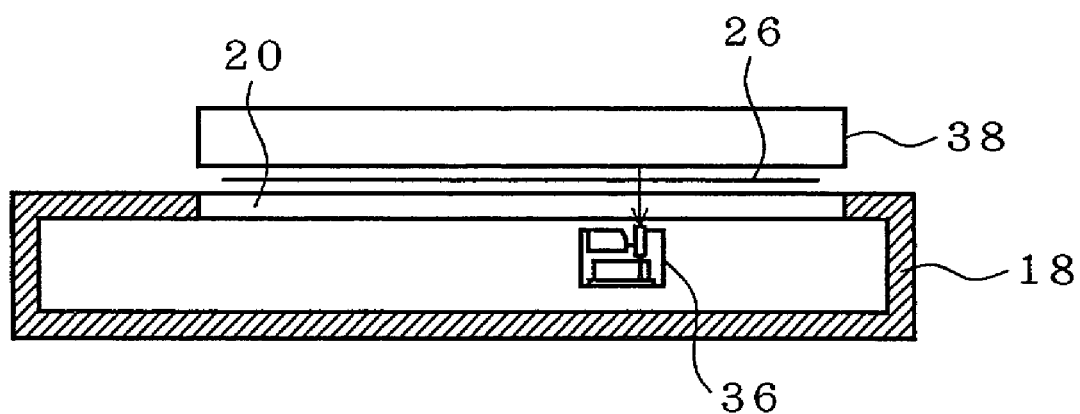
F I G. 4

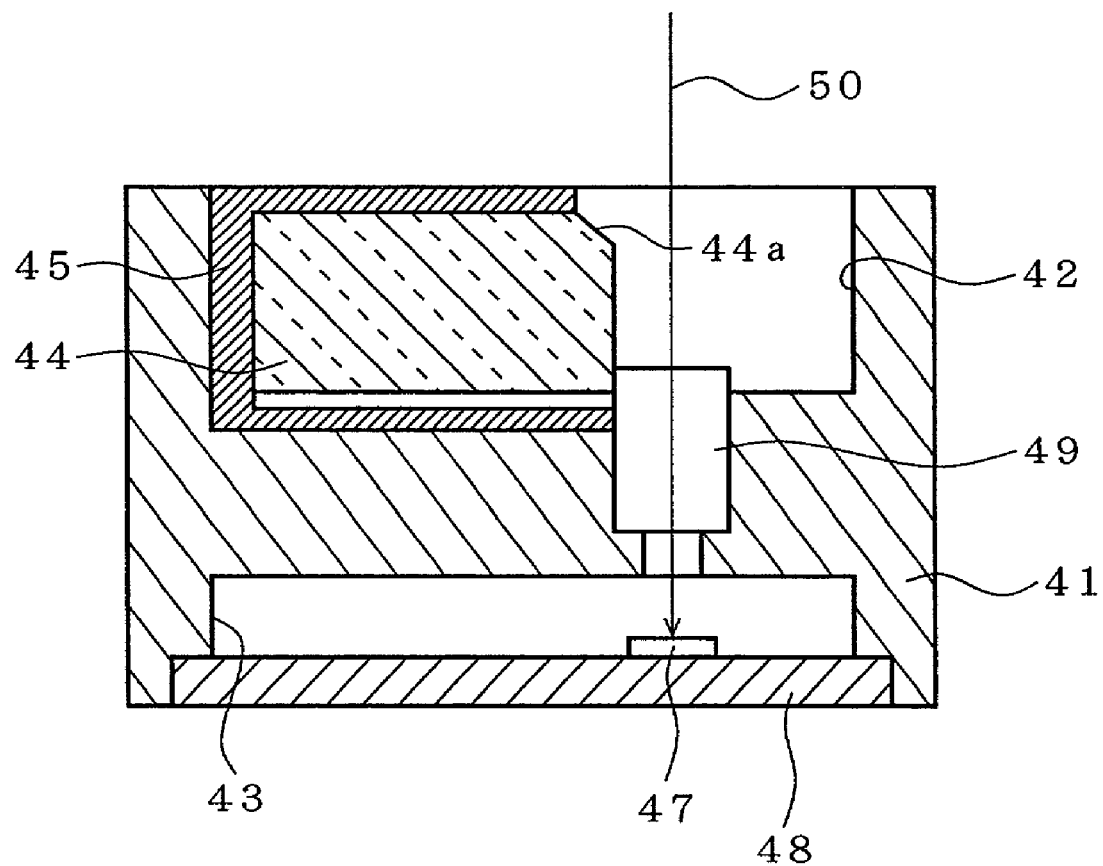
F I G. 5

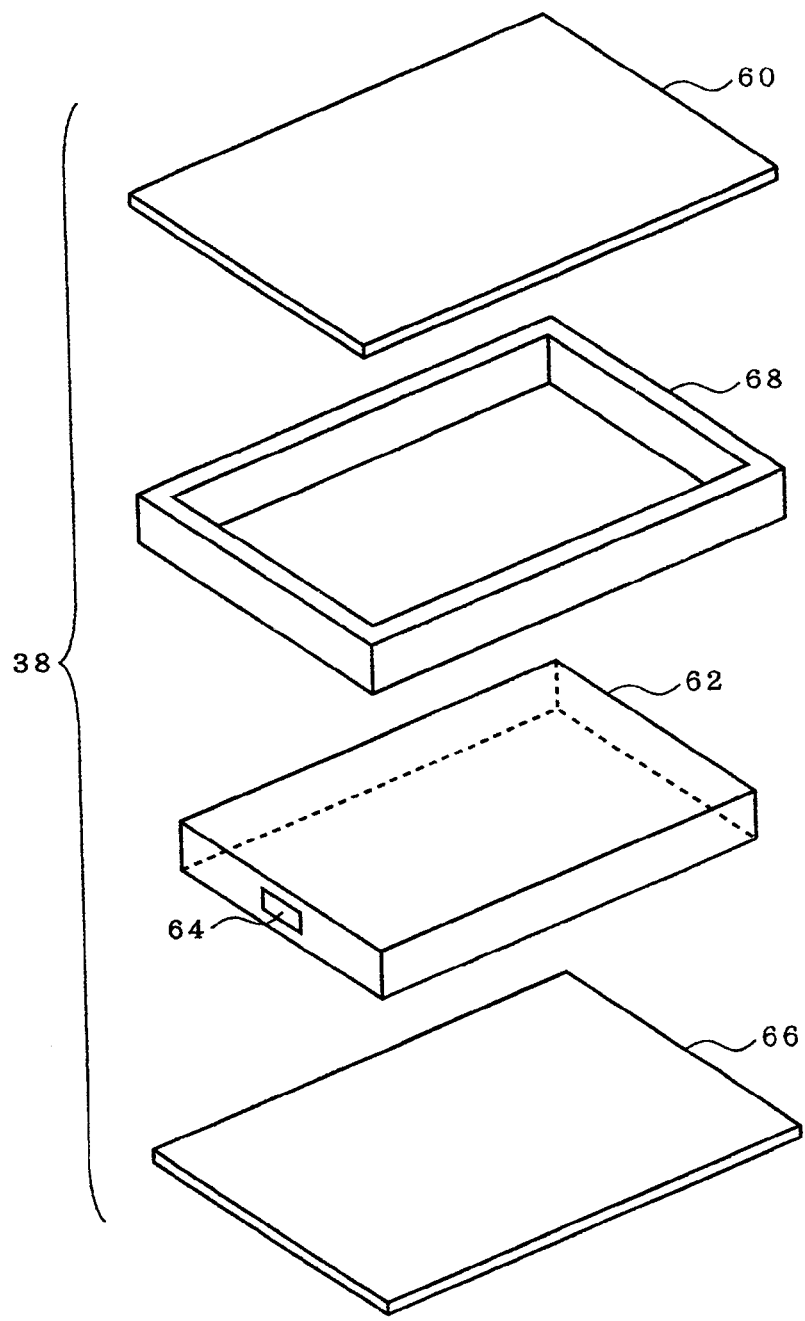
F I G. 6

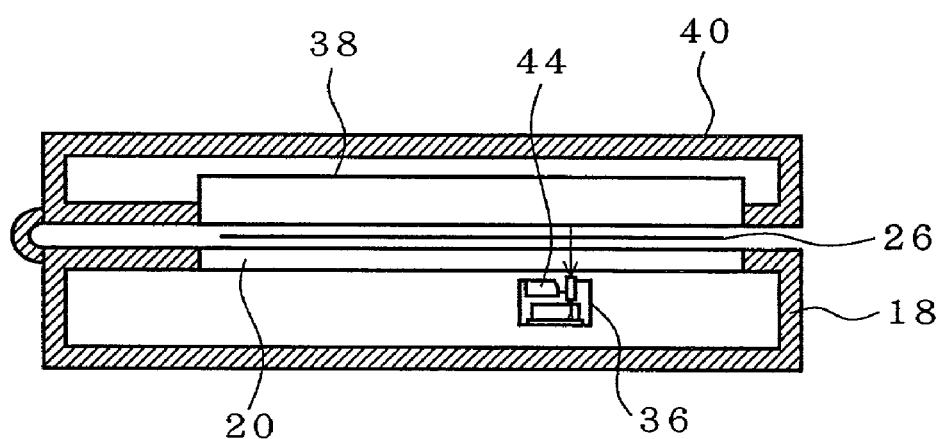
F I G. 9

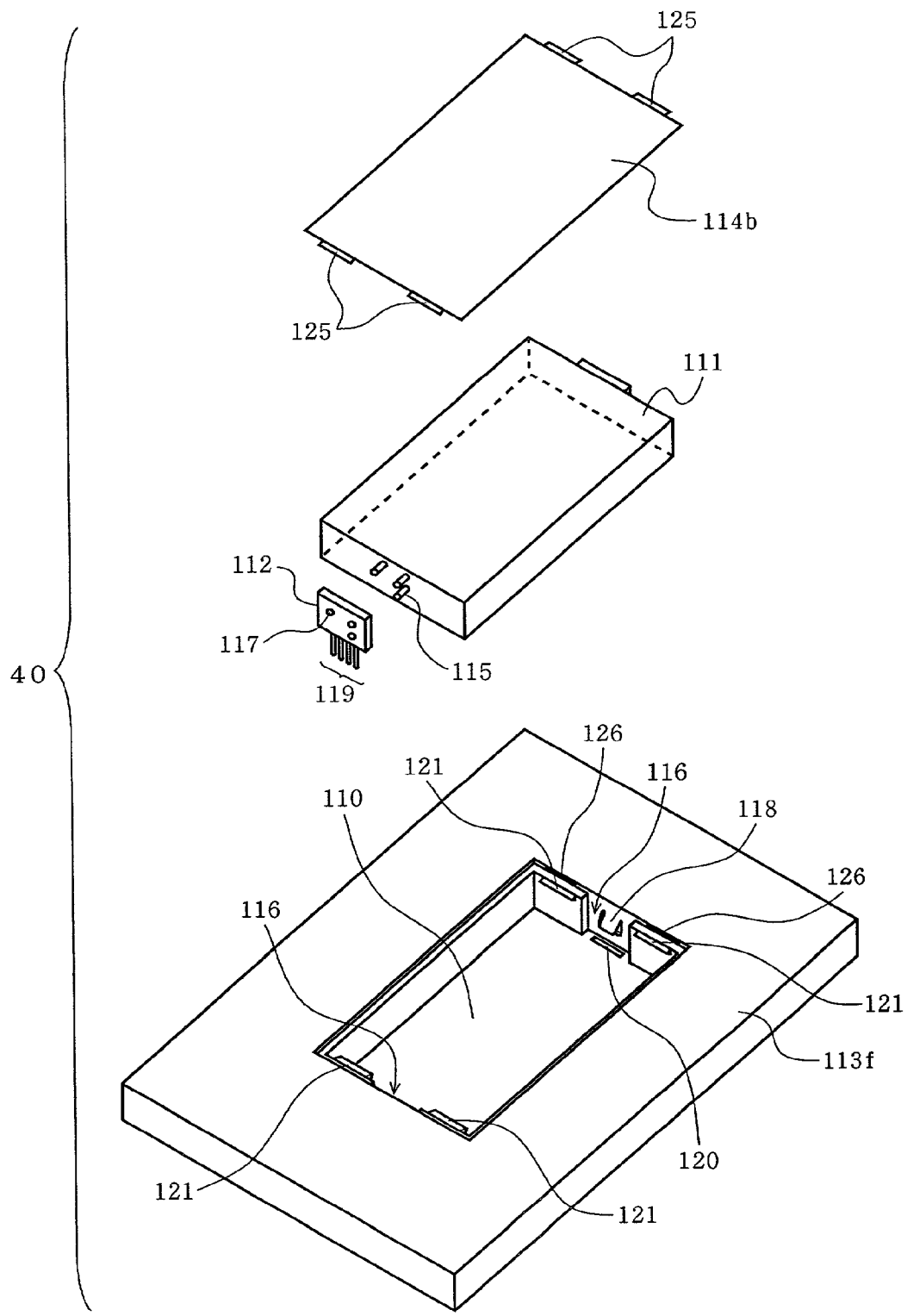
F I G. 1 5

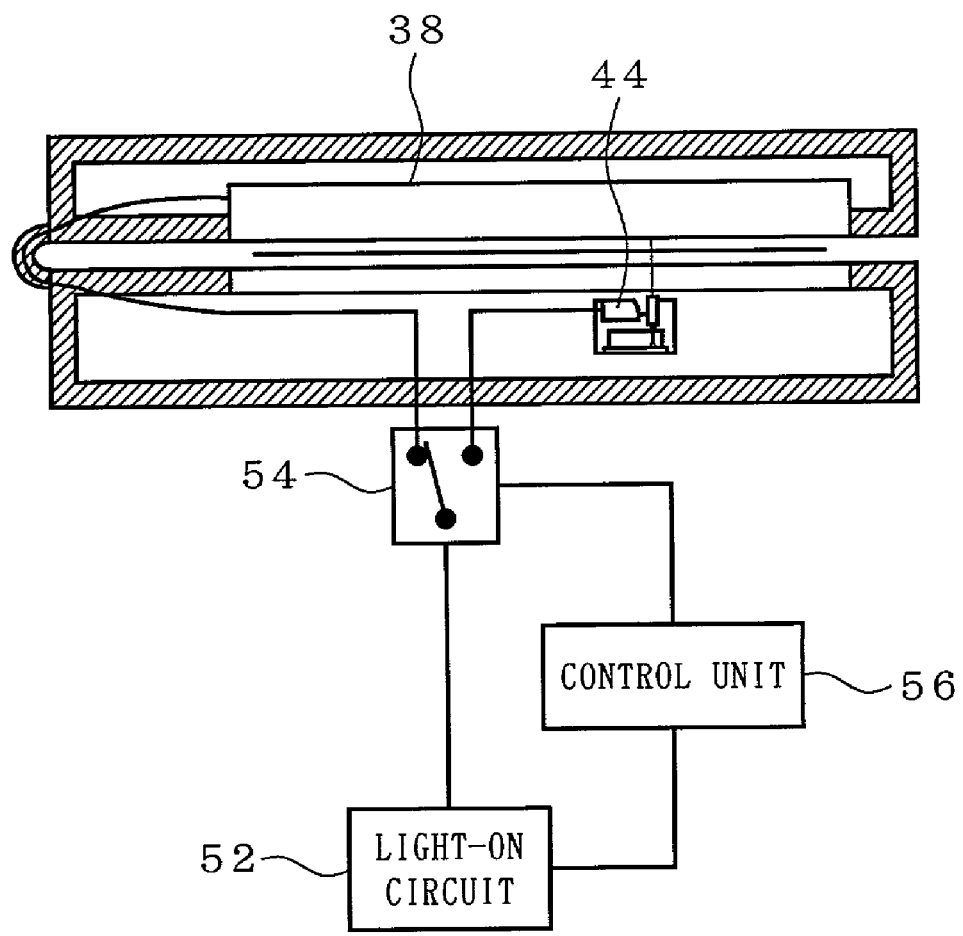
F I G. 1 6

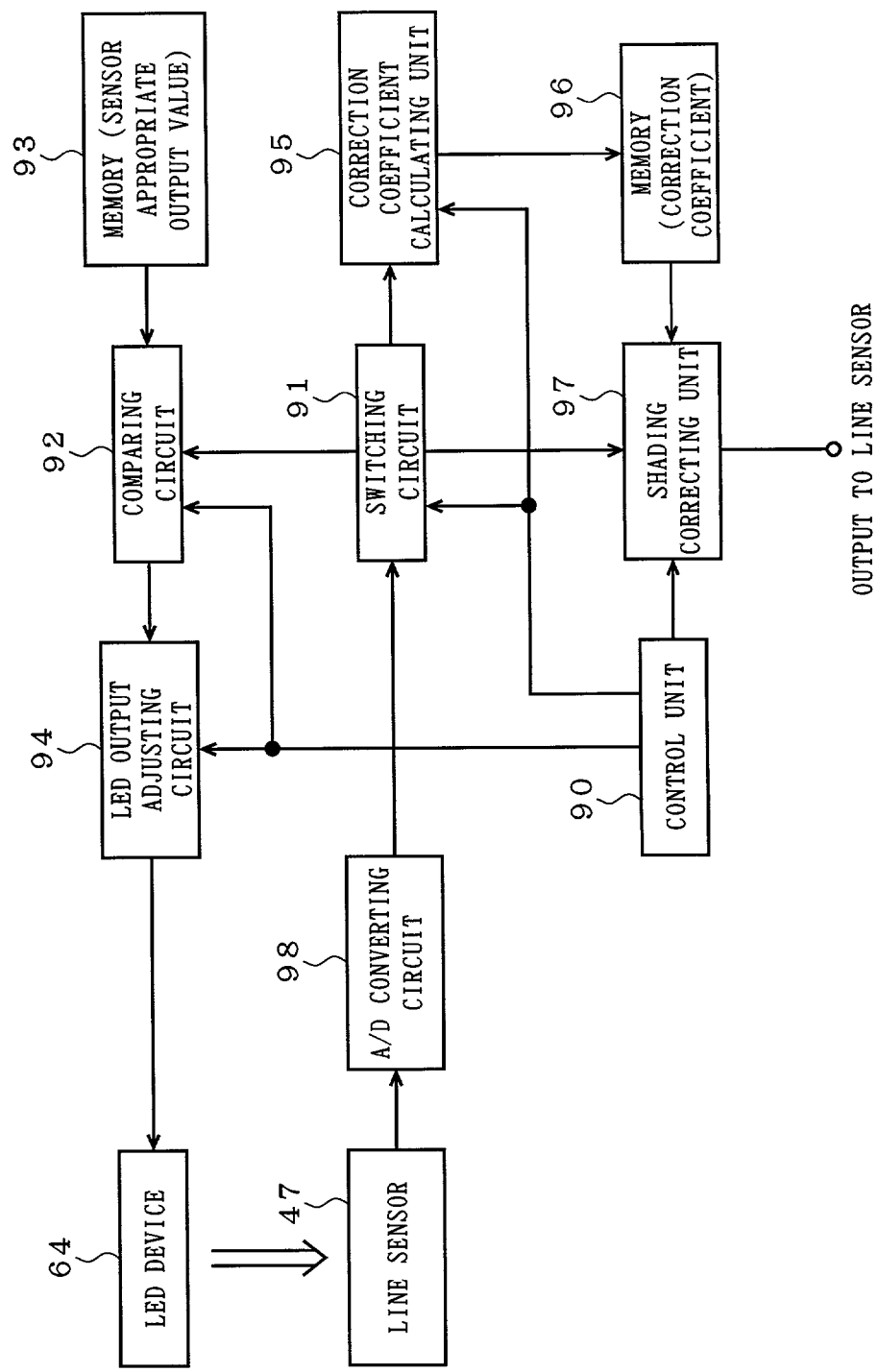
F I G. 1 7

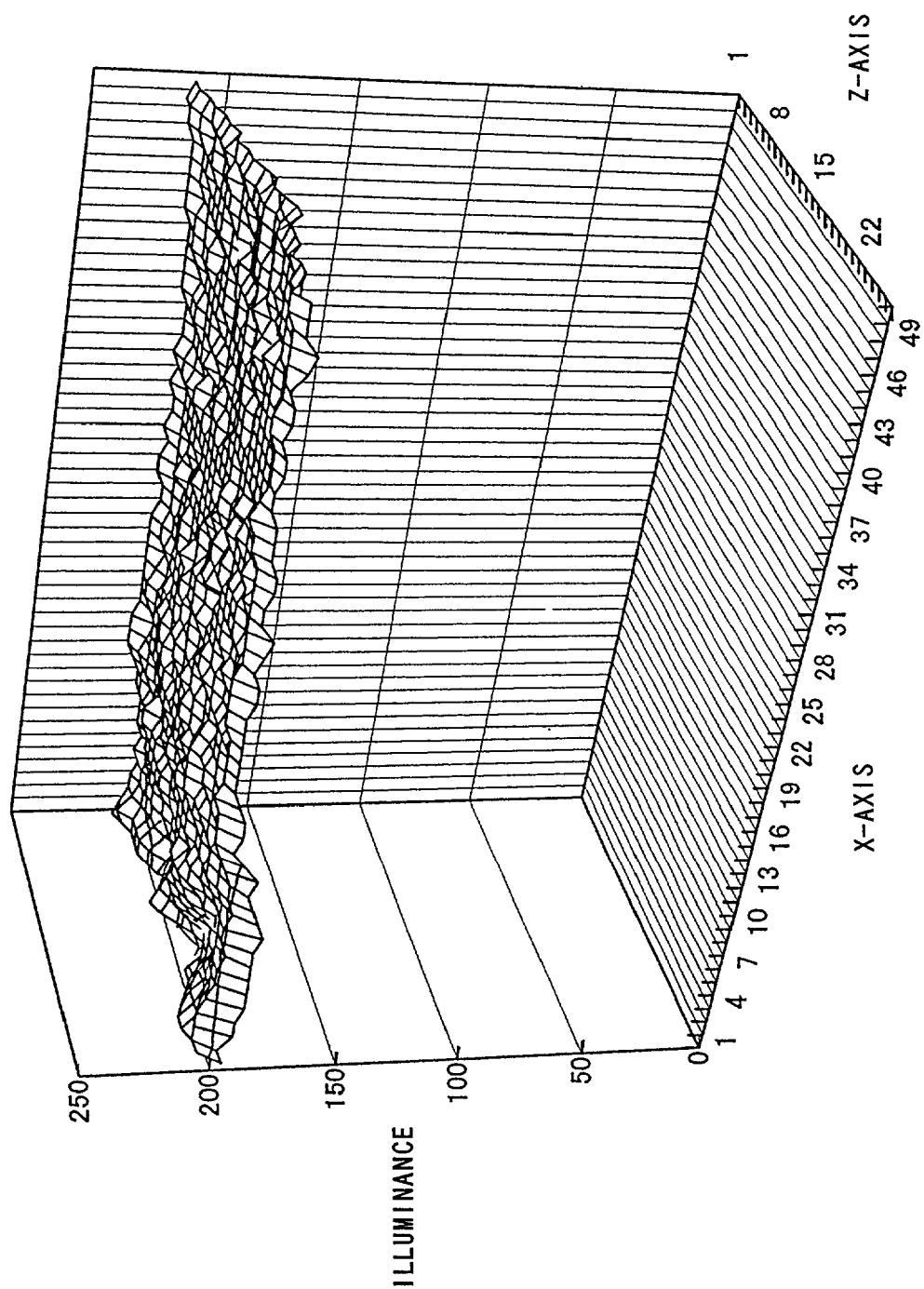
F I G. 18

IMAGE READING APPARATUS, ITS LIGHT SOURCE, AND SHADING CORRECTING APPARATUS

BACKGROUND OF THE INVENTION

1. Field of the Invention

The present invention relates to an image reading apparatus and, more particularly, to an image reading apparatus for reading a light-transmission original such as a film by using a contact image sensor and an area light source used for the image reading apparatus.

2. Description of the Related Art

An image sensor for reading an original is used for image reading apparatuses such as a facsimile machine and a copy machine. The image sensor includes a reduction-type image sensor used for reduction-optical-system-type image reading apparatuses and a contact image sensor used for contact unity-magnification-optical-system-type image reading apparatuses. The contact image sensor comprises a light source, an erect unity-magnification imaging optical system, a sensor, etc. As compared with the reduction-type image sensor, generally, this contact image sensor has such a merit that a light-path length is shorter, the size of equipment is compact, its troublesome optical adjustment is improved, and it is easily assembled in equipment. In place of the reduction-type image sensor, the contact image sensor is variously used.

FIG. 1 shows a reduction-optical-system-type image reading apparatus using a white light source and a sensor with color filters. In a case 18, the image reading apparatus in FIG. 1 includes a fluorescent lamp light source 10, a mirror 12, a lens 14, and a CCD sensor 16 with color filters. An upper surface of the case 18 is an original plate glass 20 onto which a sheet original 22 is placed and is pressed by an original cover 24. The fluorescent lamp light source 10 and the mirror 12 are reciprocatedly driven in a predetermined direction, thereby reading and scanning the original. Light 15 outputted from the fluorescent lamp light source 10 is reflected to the sheet original 22 and is inputted to the CCD sensor 16 with the color filters via the mirror 12 and the lens 14.

Further, the reduction-optical-system-type image reading apparatus comprises an area light source, serving as a light source for transmission, for reading an image of a light-transmission original such as a negative/positive film (hereinafter, simply referred to a film original). FIG. 2A shows the reduction-optical-system-type image reading apparatus, comprising the area light source. Referring to FIG. 2A, an area light source 28 is provided on a film original 26. Referring to FIG. 2B, the area light source 28 comprises a fluorescent lamp 32 on three sides of a rectangular light guide plate 30. The area light source 28 is incorporated in an original cover (not shown) or is replaced with the original cover when the film original is read.

When a film is read, the fluorescent lamp light source 10 is lit off and the area light source 28 is lit on. Light outputted from the area light source 28 passes through the film original 26, the mirror which is reciprocatedly driven for reading and scanning the film, and the lens 14, and is inputted to the CCD sensor 16 with the color filters.

FIG. 3 shows a contact-unity-magnification-optical-system-type image reading apparatus, using a light source 34 of red (R), green (G), and blue (B) light, which can be lit on by a switching operation, and a line sensor without filters. In the contact-unity-magnification-optical-system-type image reading apparatus, a contact image sensor 36 is provided in the case 18 and an upper surface thereof is an original plate glass 20 on which a sheet original 22 is placed and is pressed by an original cover 24.

The contact image sensor 36 is reciprocatedly driven in a predetermined direction, thereby reading and scanning an original. Light outputted from the light source 34 is reflected to the sheet original 22 and is inputted to the line sensor.

In the reduction-optical-system-type image reading apparatus shown in FIGS. 1 to 2B, if the fluorescent lamp light source is a white light source, the image sensor needs to have a color filter and, therefore, its structure is complicated.

The contact-unity-magnification-optical-system-type image reading apparatus in FIG. 3 cannot read the image from the film original.

SUMMARY OF THE INVENTION

Accordingly, it is one object of the present invention to provide an image reading apparatus using a contact image sensor, which is capable of reading an image from a film original.

It is another object of the present invention to provide a light source for reading an image from a film original in an image reading apparatus using a contact image sensor.

It is further another object of the present invention to provide a shading correcting apparatus and a shading correcting method for correcting the variation of sensitivities of a line sensor and the variation of illuminances of an area light source in an image reading apparatus for reading a film original.

In the present invention, an image reading apparatus for reading a light-transmission original comprises: a case having a transparent plate on its upper surface, on which the light-transmission original is placed; a contact image sensor, which can be reciprocatedly moved for reading and scanning, having an erect unity-magnification optical system and a line sensor in the case; and an area light source provided upstream of the transparent plate, for irradiating light to the light-transmission original, comprising a light guide plate on which at least one LED device including a red-, green-, and blue-LED chips is arranged to a peripheral side surface.

In the image reading apparatus, simultaneously with an operation for reading and scanning by the contact image sensor, the red-, green-, and blue-LED chips are sequentially lit on.

In the present invention, an area light source for irradiating light to a light-transmission original in an image reading apparatus for reading the light-transmission original, comprises: a light guide plate for scattering or reflecting light on a rear surface thereof; a white bottom plate for covering the rear surface of the light guide plate; a white case frame for covering a side surface of the light guide plate; a scattering sheet for covering an upper surface of the light guide plate; and at least one LED device including red-, green-, and blue-LED chips, which is arranged at a peripheral side surface of the light guide plate.

Incidentally, the LED device may be provided not only for one side surface of the light guide plate but also for two or more side surfaces. Preferably, the dot pattern of the light scatterers may be formed on the rear surface of the light guide plate.

Preferably, shading correction for correcting the variation of sensitivities of a line sensor and the variation of illuminances of an area light source in an image reading apparatus for reading a light-transmission original may be performed as follows.

That is, any of red-, green-, and blue-LED chips is lit on in the area light source, the contact image sensor scans an image in a state in which, on the transparent plate, there is no original or a semitransparent film is placed, and light from the area light source is received. The light received by the line sensor is converted into an electrical signal. Electrical weighting is performed so that an output value of the electrical signal, which varies depending on the variation of sensitivities of the line sensor and the variation of illuminances of the area light source, becomes constant. The weighting information is stored for a 2-dimensional position of each pixel in the line sensor and for the light emission of the red-, green-, and blue-LED chips and is used for shading correction upon actual image reading.

In the shading correction, the weighting information for red, green, and blue is stored. However, the weighting information only for one or two color of red, green, and blue may be stored and be set as a correction standard, thus implementing simple shading correction for correcting three colors of red, green, and blue. Further, one or more adjacent pixels may be stored as one piece of representative weighting information and this weighting information may be set as a correction standard for one or more adjacent pixels, thus implementing simple shading correction.

BRIEF DESCRIPTION OF THE DRAWINGS

FIG. 1 is a diagram showing a reduction-optical-system-type image reading apparatus;

FIG. 2A is a diagram showing a reduction-optical-system-type image reading apparatus having an area light source;

FIG. 2B is a diagram showing the area light source used for the image reading apparatus shown in FIG. 2A FIG. 3 is a diagram showing a contact-unity-magnification-optical-system-type image reading apparatus;

FIG. 4 is a diagram showing an image reading apparatus according to a first embodiment of the present invention;

FIG. 5 is a cross-sectional view of a contact image sensor;

FIG. 6 is one exploded perspective view of an area light source;

FIG. 9 is a diagram showing an image reading apparatus in which an original cover incorporates the area light source;

FIG. 15 is an exploded perspective view showing another example of the original cover for storing the light guide plate in a concave portion provided in advance for the original cover main body;

FIG. 16 is a diagram showing the circuit structure for lighting on a linear light source and the area light source;

FIG. 17 is a diagram showing the structure of a shading correcting apparatus according to a second embodiment of the present invention; and FIG. 18 is a diagram 3-dimensionally showing an example of illuminance distribution of the area light source.

DESCRIPTION OF THE PREFERRED EMBODIMENTS

Figure 7:
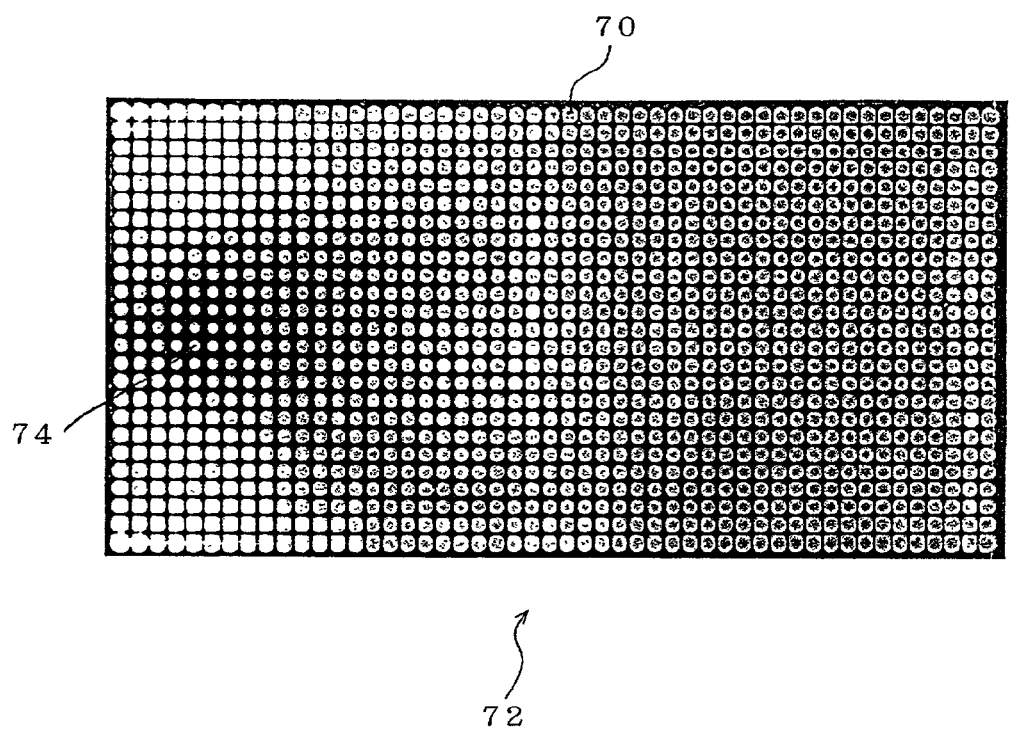
FIG. 7 is a diagram showing one example of a light scatterer pattern.

FIG. 4 shows an image reading apparatus according to a first embodiment of the present invention. Referring to FIG. 4, in the image reading apparatus, a contact image sensor 36 is arranged in a case 18 on which an original plate glass 20 is provided. On the original plate glass 20, a film original 26 is placed. An area light source 38 is provided upstream of the original plate glass 20. The area light source 38 is incorporated in an original cover (not shown) or is replaced with the original cover when the film original 26 is read.

As disclosed in Japanese Unexamined Patent Application Publication No. 10-126581 concerned with the present applicant, there is an example of the contact image sensor 36 which incorporates a linear light source which is necessary when a sheet original is read and which is lit off when a film original is read.

FIG. 5 shows a cross-sectional view of the contact image sensor disclosed in the publication. The contact image sensor 36 comprises a frame 41 comprising a concave portion 42 in which a case 45 for accommodating a linear light source 44 having a transparent light guide stick is arranged and a concave portion 43 to which a substrate 48, on which a line sensor 47 is mounted, is attached. A rod lens array 49, as an erect unity-magnification optical system, is held in the frame 41. The contact image sensor is provided on the lower side of the original plate glass 20 of the image reading apparatus and moves along a surface of the original plate glass 20 to scan an original plane.

According to the first embodiment, the above-mentioned contact image sensor 36 is used and the linear light source 44 is lit on when the sheet original is read. Since the linear light source 44 is not the feature of the present invention, the detailed description is not omitted.

If the film original 26 is read, the light 50 outputted from the area light source 38 passes through the film original 26 and the original plate glass 20, and is detected by a line sensor 47 via the rod array lens 49.

FIG. 6 is an exploded perspective view of the area light source 38 in the present invention. The area light source 38 comprises a light guide plate 62 made of flat transparent acrylic resin which is cut and worked to be rectangular-shaped. The light guide plate 62 has an LED device 64 in the center of a side surface on the shorter side. In the LED device 64, at least one LED chip having a red (R)-LED chip, a green (G)-LED chip, and a blue (B)-LED chip is mounted on a single LED package so that the R-, G-, and B-LED chips are arranged to have a constant distance between their central points and can be lit on by switching them.

A bottom surface of the light guide plate 62 is covered with a white bottom plate 66, and four sides thereof are enclosed by a white case frame 68. A scattering sheet 60 is adhered to an upper surface of the white case frame 68, that is, on a light emitting surface side. The white case frame 68 and the white bottom plate 66 are made of white ABS resin.

On a rear surface of the light guide plate 62, light scatterers are formed by a screen printing method so that a specific pattern is drawn by high-reflectance white ink. Generally, the light scatterer pattern is a circular dot one.

FIG. 7 is a diagram showing one example of the light scatterer pattern. A circular dot pattern 72 is shown by a black dot 70. The black dot 70 has a high-reflectance which becomes minimum at a portion 74 in the area.

The area light source 38 is assembled by the light guide plate 62 on which the above-mentioned circular dot pattern is printed on the rear surface. More particularly, the white bottom plate 66 is adhered to the bottom of the light guide plate 62 which is covered with the white case frame 68. The scattering sheet 60 is adhered to the light emitting side of the light guide plate 62.

Figure 8:
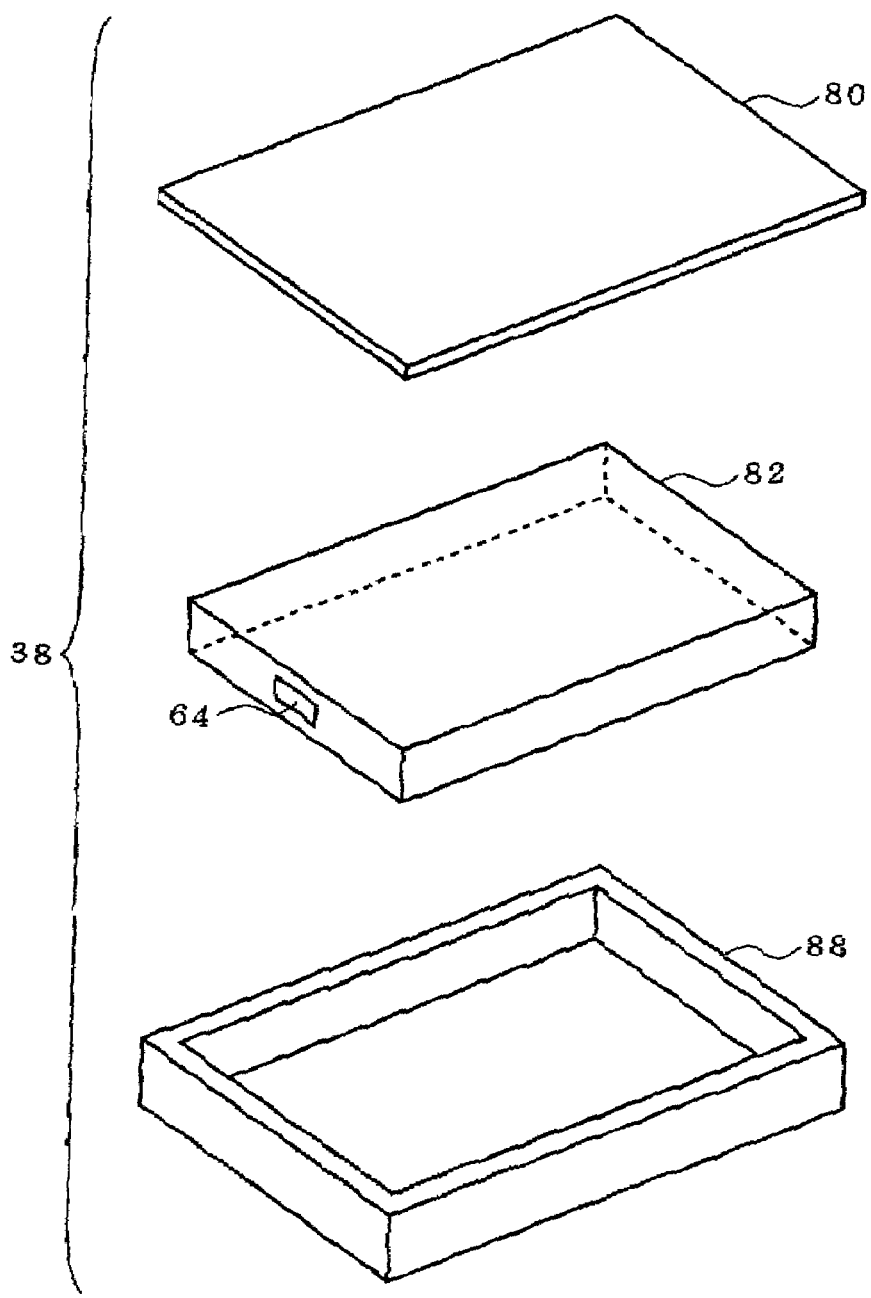
FIG. 8 is another exploded perspective view of the area light source.

FIG. 8 is another exploded perspective view of the area light source 38 in the present invention. A white case 88 is integrally formed by the white case frame 68 and the white bottom plate 66 shown in FIG. 6. A side surface and a rear surface of a light guide plate 82 are covered with the white case 88 which is made of white ABS resin. The light guide plate 82 and a scattering sheet 80 have the same structure as those of the light guide plate 62 and the scattering sheet 60 shown in FIG. 6, respectively. In the light guide plate 82, an LED device 64 is arranged in the center of a side surface on a shorter side, and light scatterers are formed with a specific pattern by high-reflectance white ink on the rear surface.

The area light source 38 shown in FIG. 8 is constructed by storing the light guide plate 82 in the white case 88 and adhering the scattering sheet 80 to the light emitting surface of the light guide plate 82.

In the area light source having the above-mentioned structure, the light outputted from the LED device is scattered by the circular dot pattern 72, reaches the scattering sheet which further scatters the light by the light guide plate 82, and is outputted from the scattering sheet 80. In the area light source, the light scatterers cause substantially a uniform distribution of illuminances.

Since the distribution of illuminances can be substantially uniform by the form of the light scatterer pattern, the LED device may be provided on two side surfaces opposed to the light guide plate and, further, on three or four side surfaces. The LED device may not necessarily be provided in the center of each side and, alternatively, may be arranged in the corner of a rectangular light guide plate. In other words, at least one LED device including the R-, G-, and B-LED chips may be arranged on the peripheral side surfaces of the light guide plate.

Although the above example uses the screen printing method as the method for forming the light scatterers, it is possible to coat the rear surface of the light guide plate with the variety of organic or inorganic light scattering materials (typically, white paint) by an offset printing method, an ink-jet printing method, etc. and thus form a scattering pattern.

In place of the application of the high-reflectance material, the rear surface of the light guide plate may be made coarse, thereby guiding the light. That is, the surface is made coarse in machine work, for example, a large number of fine uneven portions are formed by using a sandblast method or an injection mold is directly subjected to a scattering process and an obtained image is transferred upon molding. These methods utilize a light scattering reflection effect which is fundamentally caused by the coarse surface, of the light guide plate, on which uneven portions are formed.

FIG. 9 is a diagram showing an image reading apparatus which incorporates the area light source in an original cover.

The image reading apparatus comprises the contact image sensor 36 in the case 18 on which the original plate glass 20 is provided. The film original 26 or the sheet original is placed on the original plate glass 20. An original cover 40 is set upstream of the original plate glass 20, and the area light source 38 is incorporated on the opposed side of the original plate glass 20 in the original cover 40. The contact image sensor 36 incorporates the linear light source 44 which is lit on when the sheet original is read.

When the film original is read, the film original 26 is placed on the original plate glass 20 and the area light source 38 is lit on. In this case, the linear light source 44 is lit off. When the sheet original is read, the sheet original is placed on the original plate glass 20 and the linear light source 44 is lit on. In this case, the area light source 38 is lit off.

Referring to FIG. 9, the original cover 40 incorporates the area light source 38. The area light source 38 and the linear light source 44 are switched and lit on, thereby improving a troublesome operation such that the original cover 40 is replaced every switching operation of reading the film original and the sheet original.

The dimension of the area light source 38 is a multiple integer of one frame of the read film original. In other words, it is assumed that the dimension of the area light source is a multiple integer of one frame of the film original having a space between the flames. To enable up to three frames of the film original to be read, the area light source has the dimension of three frames including the spaces thereamong.

Next, a description is given of a method for incorporating the area light source in the original cover.

As the method for incorporating the area light source in the original cover, there is a method for setting in advance an arrangement space, in the original cover main body, in which the area light source 38 shown in FIG. 6 or 8 can be accommodated and fitted.

FIGS. 10A to 10D are diagrams illustrating examples for accommodating and fixing the area light source in the arrangement space which is set in advance in the original cover main body. Since light from the area light source needs to be irradiated over all of the read film so as to read the image, it is important to position the area light source at a predetermined position of the original cover main body. There are the following methods for positioning and fixing the area light source in the arrangement space which is set in advance in the original cover main body.

Figure 10A:
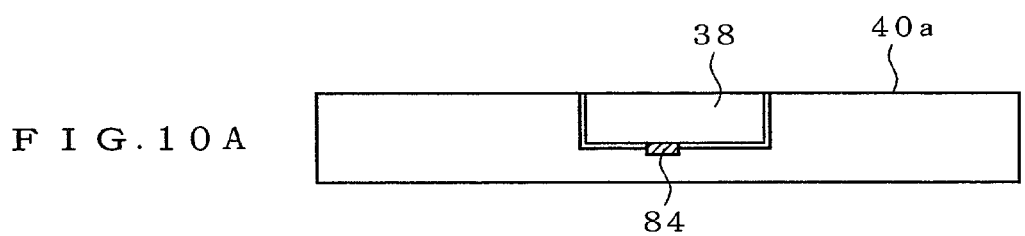
FIG. 10A is a diagram showing one example for accommodating and fixing the area light source in an original cover main body.

FIG. 10A shows a method whereby a convex portion 84 arranged to the area light source 38 is inserted to a concave portion into which the convex portion 84 is fitted, thus the area light source 38 is positioned and thereafter is fixed to an original cover main body 40*a* with adhering means such as an adhering agent.

The same effect is obtained by arranging a concave portion to the area light source 38 and arranging a convex portion, into which the concave portion is fitted, to the arrangement space. The convex portion may be a pin and the concave portion may be a hole into which the pin is fitted.

Figure 10B:
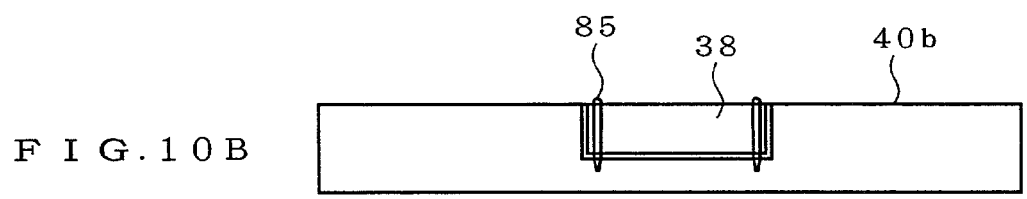
FIG. 10B is a diagram showing another example for accommodating and fixing the area light source in the original cover main body.

FIG. 10B shows a method whereby the area light source 38 is fixed to an original cover main body 40*b* by a screw 85 which passes through a screw hole provided in advance to the arrangement space, via a hole provided in the area light source 38.

Figure 10C:
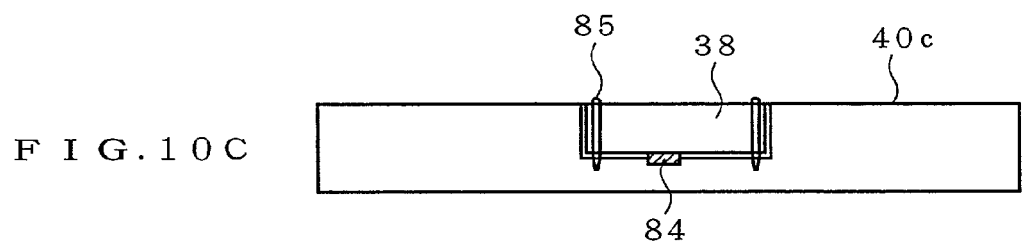
FIG. 10C is a diagram showing another example for accommodating and fixing the area light source in the original cover main body.

FIG. 10C shows a method whereby, for purpose of further accurately positioning, the area light source 38 is positioned by using the convex portion 84 shown in FIG. 10A and the concave portion which is fitted thereinto, thereafter, it is fixed to an original cover main body with the screw 85 which passes through the screw hole provided in advance to the arrangement space, via the hole provided therein.

Figure 10D:
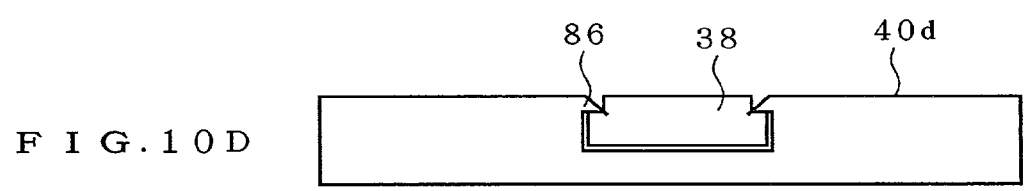
FIG. 10D is a diagram showing another example for accommodating and fixing the area light source in the original cover main body.

FIG. 10D shows a method whereby an the area light source 38 is fixed to an original cover main body 40*d* with a hook 86, as a projected latching portion, on a side surface of the arrangement space. By fixing with the hook 86, the area light source 38 can easily be attached/detached.

Further, as the method for incorporating the area light source in the original cover, there is a method whereby a light guide plate having an LED device is stored in a concave portion which is provided in advance to an original cover main body and, after that, a scattering sheet is adhered to the light emitting surface of the light guide plate.

Figure 11:
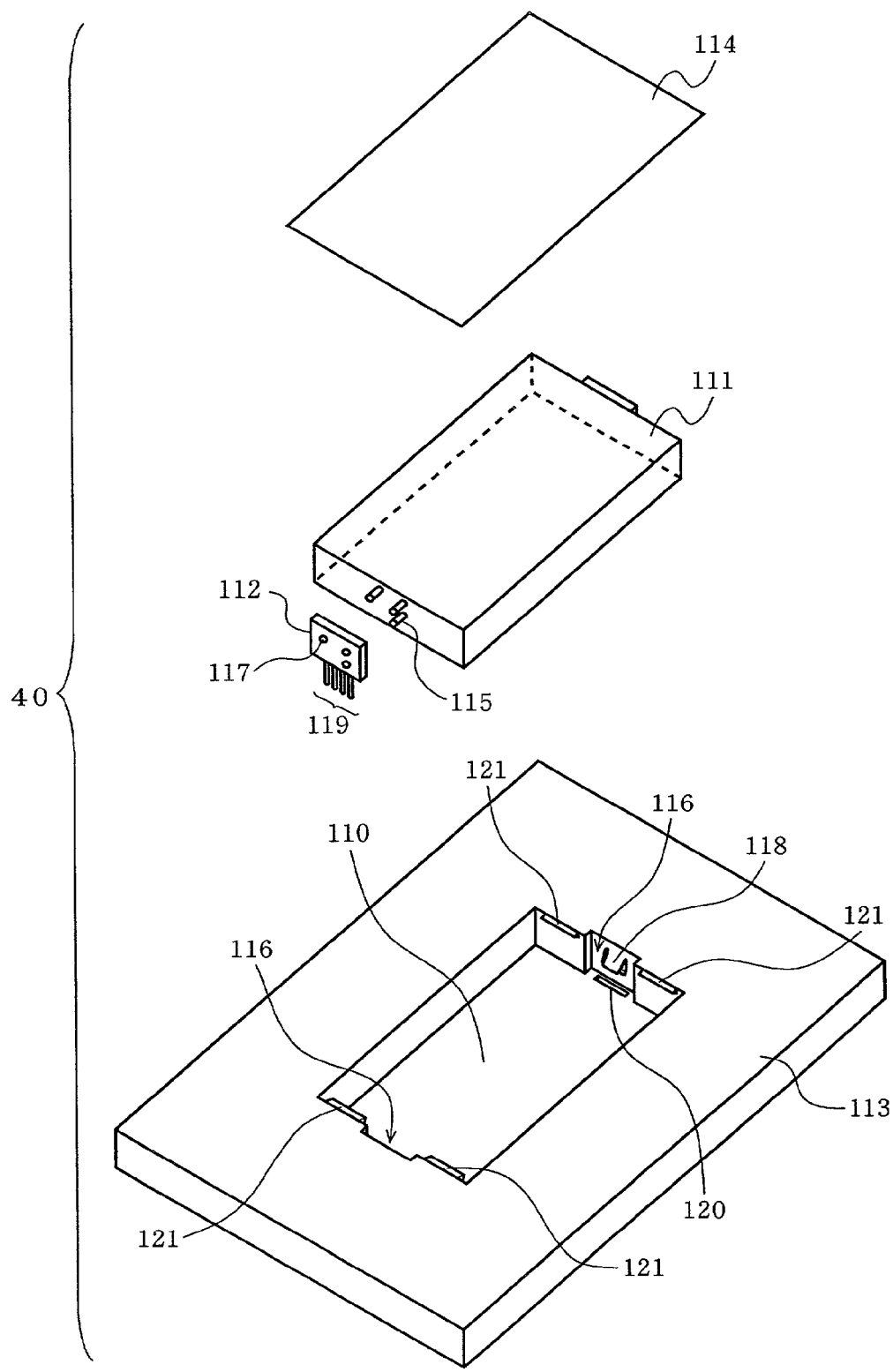
FIG. 11 is an exploded perspective view showing one example of an original cover for storing a light guide plate in a concave portion provided in advance for the original cover main body.

FIG. 11 is an exploded perspective view showing one example of an original cover 40 for storing a light guide plate in a concave portion provided in advance for the original cover main body.

Three pins 115 for positioning an LED module 112 are provided on a side surface of a light guide plate 111 on the shorter side. The pins 115 are formed integrally with or separately from the light guide plate 111. On a lower surface of the light guide plate 111, a light scattering pattern is formed to scatter light incident on the light guide plate 11 from the LED module 112.

The LED module 112 comprises R-, G-, and B-LED chips and has holes 117 for being fitting into the pins 115. By fitting the pins 115 to the holes 117, the LED module 112 is attached to the light guide plate 111 without an adhering agent and is positioned.

A concave portion 116 for accommodating the LED module 112 is formed on the opposed inside surface in the direction perpendicular to the longitudinal direction of a concave portion 110 provided for an original cover main body 113. A spring 118 having a plate-spring-shaped structure for pressing the LED module 112 to the light guide plate 111 is formed to a concave portion 116. When the LED module 112 is mounted on the light guide plate 111 by the three pins 115 and is positioned, the spring 118 may be not used.

A lead picking-out hole 120 for picking out a lead 119 of the LED module 112 is provided for a bottom cover, of the original cover main body 113, which is exposed by forming the concave portion 116.

A hook 121, as a projected latching portion, is provided for an upper portion of both inside surfaces on the concave portion 116.

When the original cover 40 is assembled, first, the LED module 112 is mounted on the light guide plate 111 and is positioned by piecing the pins 115 formed in the light guide plate 111 to the holes 117 formed to the LED module 112.

Next, the light guide plate 111 is fitted, toward the down direction, to the concave portion 110 of the original cover main body 113, and there is fixed with the hook 121 provided for the upper portion on the inside surfaces of the concave portion 110. In this case, the LED module 112 is pressed and fixed to the light guide plate 111 with the spring 118 provided for the original cover main body 113. Finally, the scattering sheet 114 is adhered toward the down direction.

Figure 12A:
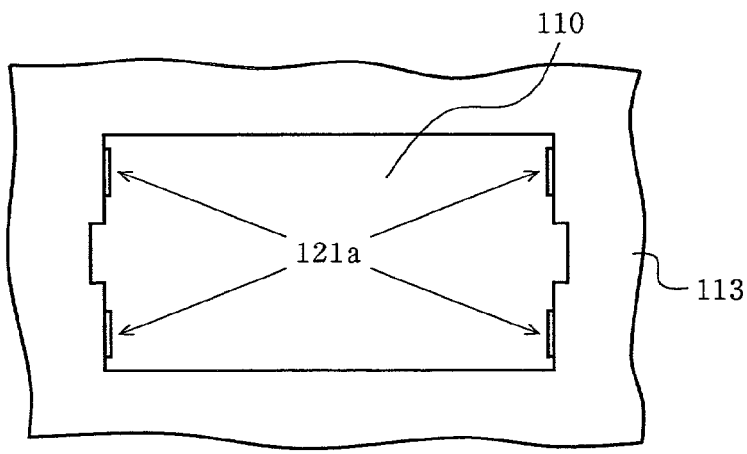
FIG. 12A is a partial plan view of an original cover main body in which one example of a hook formed portion is shown.
Figure 12B:
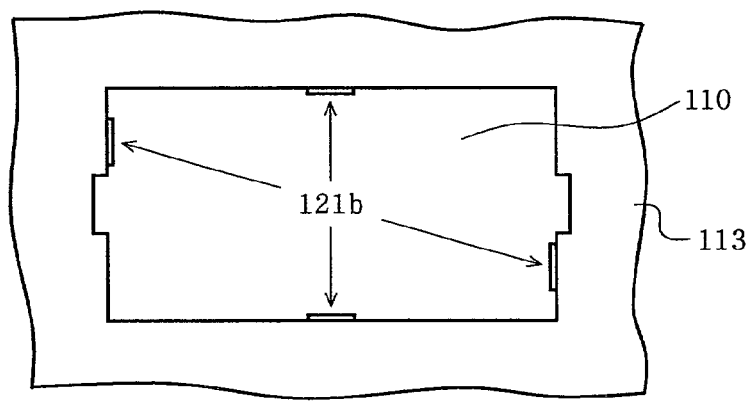
FIG. 12B is a partial plan view of an original cover main body in which another example of the hook formed portion is shown.
Figure 12C:
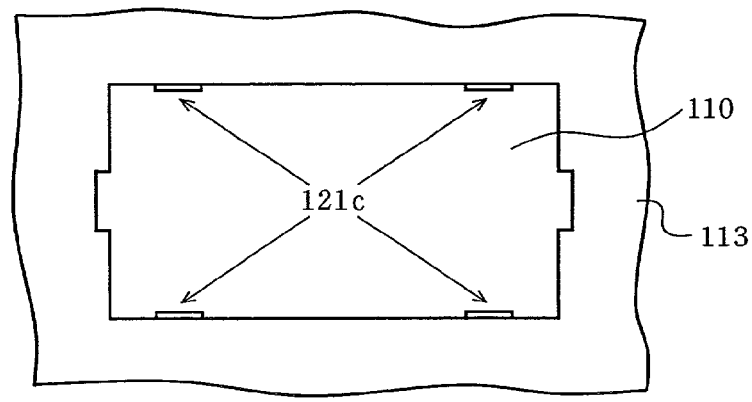
FIG. 12C is a partial plan view of an original cover main body in which another example of the hook formed portion is shown.

Next, a description is given of modified examples in which the hook position for fixing the light guide plate to the original cover main body. FIGS. 12A to 12C are partial plan views of the original cover main body in which the examples of the hook formed portion are shown.

FIG. 12A shows a case in which a total of four hooks 121*a* is formed on the same positions FIG. 11 according to the first embodiment, that is, on the opposed inside surfaces in the direction perpendicular to the longitudinal direction of the concave portion 110. The hooks 121*a* are formed on both sides of the LED module mounted position.

Also, FIG. 12B shows a case in which a total of four hooks 121*b* is formed on the opposed inside surfaces in the direction perpendicular to the longitudinal direction of the concave portion 110 and on the opposed inside surfaces in the longitudinal direction of the concave portion 110. The hooks 121*b*, which are formed on the opposed inside surfaces in the direction perpendicular to the longitudinal direction of the concave portion 110, have a positional relationship such that they are point-symmetrical with respect to the center of the concave portion 110. The hooks 121*b*, which are formed on the opposed inside surfaces in the longitudinal direction of the concave portion 110 are positioned in the center of the inside surfaces in the longitudinal direction.

Further, FIG. 12C shows a case in which a total of four hooks 121*c* is formed apart from each other on the opposed inside surfaces of the concave portion 110 in the longitudinal direction.

FIGS. 13A to 13D are partial cross-sectional views of the original cover in examples of a hook in the height direction of the original cover main body.

Figure 13A:
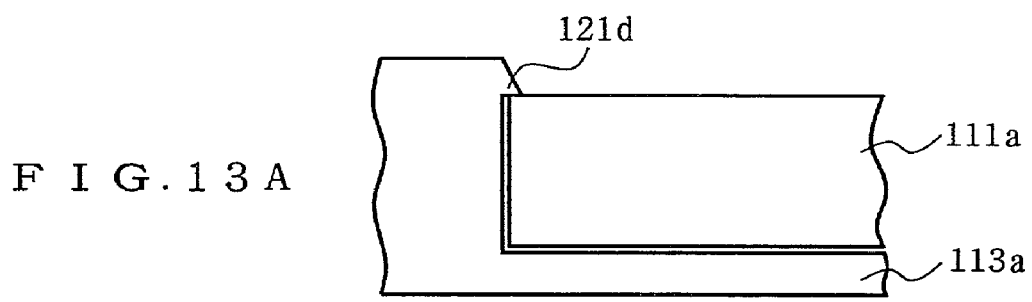
FIG. 13A is a partial cross-sectional view of the original cover in which one example of a hook formed position is shown in the height direction.

FIG. 13A shows a case in which a hook 121*d*, as a projected latching portion, having an abutting surface at the down edge is provided at the top of the side surface of the concave portion provided for the original cover main body 113*a*, the height of the light guide plate 111*a* ranges up to an abutting surface of the hook 121*d*, and the light guide plate 111*a* is abutted on the abutting surface on the down side and is fixed to the original cover main body 113*a*.

Figure 13B:
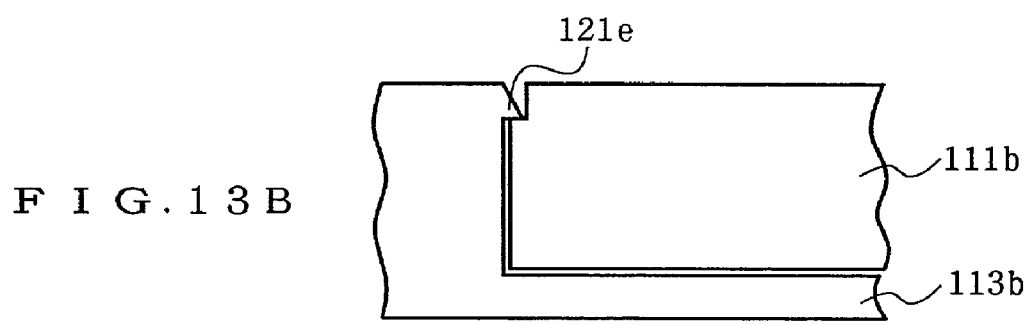
FIG. 13B is a partial cross-sectional view of the original cover in which another example of the hook formed position is shown in the height direction.

FIG. 13B shows a case in which a hook 121*e* is provided at the top of the side surface of the concave portion provided for an original cover main body 113*b*, a light guide plate 111*b* is formed to have a stepped surface abutted against an abutting surface of the hook 121*e* toward the up direction, and the upper surface of the light guide plate 111*b* and the upper surface of the original cover main body 113*b* are coplanar.

Figure 13C:
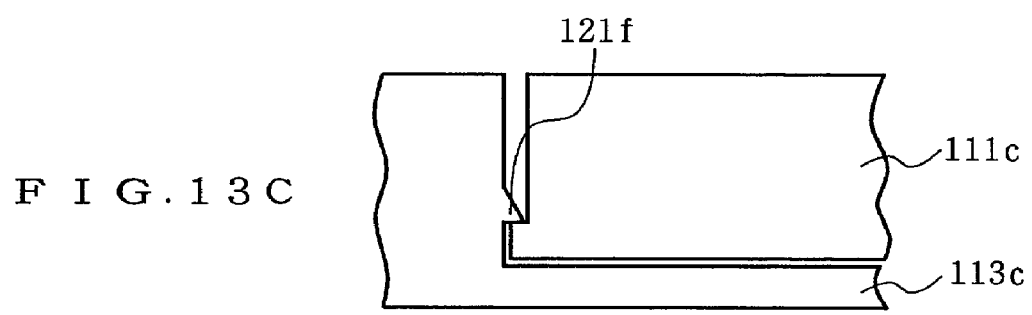
FIG. 13C is a partial cross-sectional view of the original cover in which another example of the hook formed position is shown in the height direction.

FIG. 13C shows a case in which a hook 121*f* is arranged at the intermediate position in the height direction of the side surface of the concave portion arranged to an original cover main body 113c, a light guide plate 111c is formed to have a stepped surface abutted against an abutting surface of the hook 121f toward the up direction, the upper surface of the light guide plate 111c and the upper surface of the original cover main body 113c are coplanar.

Figure 13D:
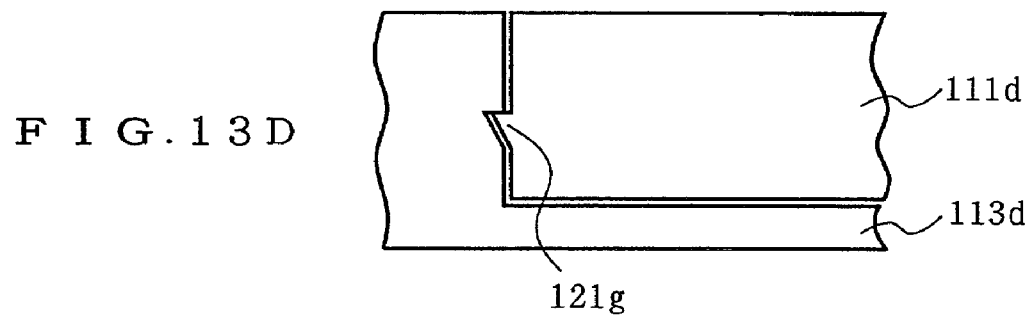
FIG. 13D is a partial cross-sectional view of the original cover in which another example of the hook formed position is shown in the height direction.

FIG. 13D shows a case in which a hook 121g is arranged at the intermediate position in the height direction of a light guide plate 111d, and a concave portion is arranged at the intermediate position in the height direction of the side surface of the concave portion arranged at an original cover main body 113d so as to be fitted into the hook 121g.

Figure 14:
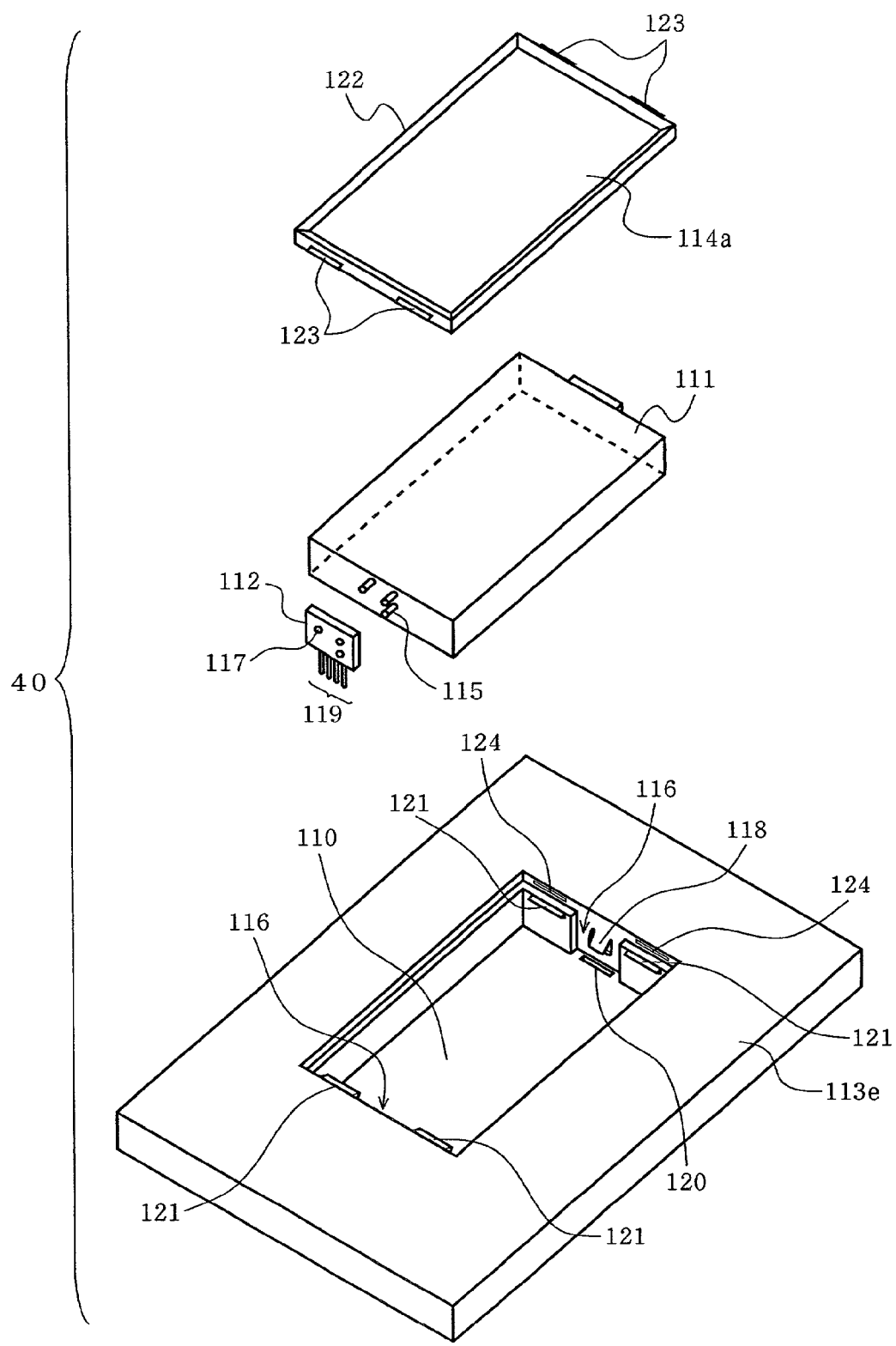
FIG. 14 is an exploded perspective view showing another example of the original cover for storing the light guide plate in the concave portion provided in advance for the original cover main body.

FIG. 14 is an exploded perspective view showing another example of an original cover 40 for storing a light guide plate in a concave portion provided in advance for the original cover main body.

Referring to FIG. 14, a scattering sheet 114a is adhered to the lower surface of a reinforcement frame 122, made of acrylic resin, which is provided in the periphery of the scattering sheet 114a. An original cover main body 113e has a notch corresponding to a portion for accommodating the reinforcement frame 122 of the scattering sheet 114a on the upper portion of the side surface of the concave portion 110. A hook 123, as a projected latching portion, is provided at an outside surface of the shorter side of the reinforcement frame 122. By fitting the hook 123 to a concave portion 124 provided at an inside surface of the notch of the original cover main body 113e, the reinforcement frame 122 is accommodated in the original cover main body 113e. Others are similar to those in FIG. 11 and the description is omitted.

Incidentally, the hook 123, as the projected latching portion, may be arranged at the outside surface of the longer side of the reinforcement frame 122.

FIG. 15 is an exploded perspective view showing another example of the original cover for storing a light guide plate in the concave portion provided in advance for the original cover main body.

Referring to FIG. 15, a notch corresponding to a portion for accommodating a scattering sheet 114b made of acrylic resin is provided on the upper portion of a side surface of the concave portion 110 of an original cover main body 113f. A hook 125, as a projected latching portion, is provided on the shorter side of the scattering sheet 114b. The scattering sheet 114b is accommodated in the original cover main body 113f by fitting the hook 125 into a concave portion 126 provided on an inside surface of the notch in the original cover main body 113f. Others are similar to those in FIG. 11 and the description is omitted.

Incidentally, the hook 125, as the projected latching portion, may be provided on the longer side of the scattering sheet 114b.

Since the example in FIG. 11 represents the structure in which the scattering sheet is adhered toward the down direction, working processes such as sheet positioning and sheet cutting are necessary. However, since the examples in FIGS. 14 and 15 represent the structure in which the scattering sheet is fitted into the original cover main body, the above-described working processes can be omitted.

FIG. 16 is a diagram showing the circuit structure for lighting on the linear light source and the area light source in an image reading apparatus for reading the film original and the sheet original.

A control unit 56 is connected to a light-on circuit 52 and a switch 54. The light-on circuit 52 is connected to the area light source 38 and the linear light source 44 via the switch 54.

The control unit 56 transmits a control signal to the switch 54 and thus the switch 54 is electrically operated by switching the light-on circuit 52 for lighting on the area light source 38 and the linear light source 44.

That is, when the film original is read, the light-on circuit 52 is operated by the control signal transmitted from the control unit 56, the control signal is outputted to the switch 54 and thus the switch 54 is switched, thereby transmitting an output of the light-on circuit 52 to the area light source 38.

When the sheet original is read, the light-on circuit 52 is operated by the control signal transmitted from the control unit 56, the control signal is outputted to the switch 54 and thus the switch 54 is switched, thereby transmitting an output of the light-on circuit 52 to the linear light source 44.

The switch 54 may manually be switched. Although the light-on circuits of the area light source 38 and the linear light source 44 may independently provided, the light-on circuit is shared as shown in FIG. 16 and, consequently, the number of parts and the manufacturing costs can be reduced.

Although the film original is pressed by the original cover containing the area light source in the first embodiment, a cover having an area light source and a transparent plate are provided and the cover may be closed after pressing the film original by the transparent plate.

Hereinbelow, a description is given of operations for reading the film original by the image reading apparatus having the above structure.

The film original 26 is placed on the original plate glass 20, and the area light source 38 is arranged on the film original 26 and is lit on. As mentioned above, the linear light source 44 of the contact image sensor 36 is lit off.

The contact image sensor 36 is reciprocatedly moved in a single direction to read and scan the film original 26. This reciprocating movement is iterated for three primary colors of red, green, and blue. More specifically, simultaneously with the operation for reading and scanning the contact image sensor 36, the LED device 64 sequentially lights on the red, green, blue light.

Light outputted by the area light source 38 passes through the film original 26, is inputted to the line sensor 47 by using the rod lens array 49, and is converted into an electrical signal, thus reading an image.

In the case of the reading the image, preferably, shading correction may be performed to correct the variation of dot sensitivities of the line sensor 47 and the variation of the illuminance of the area light source 38.

In general, when the sheet original is read, only dots of the line sensor may be subjected to the shading correction. However, when the film original is read, preferably, pixels of the line sensor may be subjected to 2-dimensional shading correction, corresponding to the moved position of the line sensor because the area light source is used.

Next, a description is given of a shading correcting apparatus used for the image reading apparatus of the present invention. FIG. 17 is a diagram showing the structure of a shading correcting apparatus according to a second embodiment of the present invention.

Referring to FIG. 17, a shading correcting apparatus comprises: a control unit 90 for integrally controlling the shading correcting apparatus; a switch circuit 91 for switching an output destination of the electrical signal of the line sensor 47 via an A/D converting circuit 98 under the control of the control circuit 90; a memory 93 for storing a sensor appropriate output value, that is, an output value of the electrical signal of the line sensor 47, which is not saturated; a comparing circuit 92 for comparing the output value of the electrical signal of the line sensor 47 with the sensor appropriate output value; an LED output adjusting circuit 94 for adjusting a light output of the LED based on the comparison result; a correction coefficient calculating unit 95 for calculating a correction coefficient for weighting; a memory 96 for storing the correction coefficient calculated by the correction coefficient calculating unit 95; and a shading correcting unit 97 for multiplying the correction coefficient read from the memory 96 to the output value of the electrical signal of the line sensor 47.

Next, a description is given of an operation of the shading correcting apparatus shown in FIG. 17.

First, any of red, green, and blue LED chips in an LED device 64 is lit on. In a state in which, on a transparent plate, there is no original or a semitransparent film having a light transmittance equal to that of a read negative/positive film is placed, the contact image sensor reads and scans an image, the line sensor 47 receives light from the area light source, and an electrical signal is outputted. After the A/D converting circuit 98 A/D converts the electrical signal outputted from the line sensor 47, the switching circuit 91 is switched under the control of the control unit 90, thereby outputting the electrical signal transmitted from the line sensor 47, which is A/D converted, to the comparing circuit 92. The comparing circuit 92 compares the output value of the electrical signal from the line sensor 47, which is outputted by the switching circuit 91, with the sensor appropriate output value which is read from the memory 93. The LED output adjusting circuit 94 adjusts the light output of the LED device 64 based on the comparison result by using a light-on current value, a light-on pulse width, and the like so that the output value of the electrical signal from the line sensor 47 prevents from being saturated.

In a state in which there is no original or the semitransparent film is placed while the light output of the LED device 64 is determined, the contact image sensor reads and scans the image. Then, the line sensor 47 receives light from the area light source and outputs the electrical signal. The A/D converting circuit 98 A/D converts the outputted electrical signal from the line sensor 47, thereafter, the switching circuit 91 is switched under the control of the control unit 90, and the A/D converted electrical signal from the line sensor 47 is outputted to the correction coefficient calculating unit 95. The output values of the electrical signals from the line sensor 47 vary depending on the position of the line sensor, which causes the variation of sensitivities of the line sensor and the variation of illuminances of the area light source. The correction coefficient calculating circuit 95 calculates electrical weighting so that the varied output values of the electrical signals become constant. The calculated weighting information is stored in the memory 96 as the correction coefficient for the 2-dimensional positions of pixels of the line sensor and for the light emission of the red, green, and blue LED chips and is used for correction when the image is actually read.

According to a weighting method, the memory stores the correction coefficient serving as a reciprocal number of the output value of the electrical signal for each pixel, or a value obtained by multiplying the reciprocal number of the output value of the electrical signal by a constant (e.g., an average of the output value of the electrical signal for each pixel).

The semitransparent film uses a base film which is a base material of the read film. When the image is read, the base film has a higher transmittance than that of the film which is actually read. Therefore, by adjusting the light output of the LED device 64 so that the output value of the electrical signal of the line sensor 47 is never saturated by using the base film, the output value of the electrical signal of the read film is never saturated.

More specifically, upon the LED output adjustment or the shading correction, a dynamic range when reading the original by all colors of red, green, and blue can be wide because the film having the same color as that of the base of the read film, that is, the base film is used, as compared with the case in which there is no original or the semitransparent film having other colors is used.

When the image is actually read, the switching circuit 91 is switched under the control of the control unit 90 and the electrical signal from the lines sensor 47 is outputted to the shading correcting unit 97. In the shading correcting unit 97, the correction coefficient is read from the memory 96 and the output value of the electrical signal for each pixel, which is outputted from the line sensor 47, is multiplied by the correction coefficient corresponding to each pixel, thereby reducing the variation of sensitivities of the line sensor and the variation of illuminances of the area light source.

A large memory capacity is necessary when the shading correction is performed by using the correction coefficient which is set for each pixel and for each of red, green, and blue. When an A4-size image is read with a resolution of 600 dpi (600 dots per 2.54 cm (1 inch)), image information is approximately 100 MB, that is, a large memory capacity, on a TIFF format. A large capacity memory is necessary each time of calculating in a manner such that the correction coefficient is read every pixel and every color of red, green, and blue and the read correction coefficient is multiplied to the output value of the electrical signal of each pixel.

Next, a description is given of methods for reducing the memory capacity of the correction coefficient.

According to a first method, the memory stores the correction coefficient for the light emission of one or two LED chips among the R-, G-, and B-LED chips and the stored correction coefficient, as a correction standard, is applied to the remaining LED chip, thus reducing the memory capacity. By storing the correction coefficient of only one or two LED chips of the R-, G-, and B-LED chips, the memory capacity can be reduced to be ⅓ or ⅔, as compared with the case in which the correction coefficients for all of the R-, G-, and B-LED chips are stored.

According to a second method, in place of the correction coefficient set for each pixel, one correction coefficient is used, as a representative correction coefficient, for a plurality of pixels and the memory capacity for the correction coefficient can be reduced.

One correction coefficient is used, as a representative correction coefficient, for the number of adjacent pixels, for, e.g., h (h=4, 9, 16, . . . ) serving as a square of integer, i (i=2, 4, 6, 8, . . . ) serving as a multiple of 2, j (j=3, 6, 9, 12, . . . ) serving as a multiple of 3, and k (k=4, 8, 12, 16, . . . ) serving as a multiple of 4.

Incidentally, the number of adjacent pixels, to which one representative correction coefficient is used, is not constant every area of each pixel and may be different every area of each pixel.

In this case, an area having a small variation of outputs values of the electrical signals for pixels has a larger number of adjacent pixels to which one representative correction coefficient is used, as compared with an area having larger variation of output values of the electrical signals for pixels.

FIG. 18 is a diagram 3-dimensionally showing an example of illuminance distribution of the area light source when light of the green (G)-LED chip is emitted. The variation of illuminances of the area light source is not always uniform in the area. An area having a large variation as shown in an area of X-axis (1) side or an area having a small variation as shown in an area of X-axis (49) side is caused. Not only the variation of illuminances of the area light source but also the variation of sensitivities of the line sensor has an effect on the variation of output values of electrical signals for pixels. The number of adjacent pixels, for which one correction coefficient is used as a representative one, is reduced in the area having a large variation of output values of electrical signals for pixels, and it is increased in the area having a small variation.

According to a third method, the correction coefficient for one pixel on a predetermined line is used as the correction coefficient of all pixels, in the reading direction, which intersect with the pixel, thus reducing the memory capacity. Similarly to the case of usually reading the sheet original, at any desired position on the area light source, the correction coefficient only for one line corresponding to each dot of the line sensor is stored and the stored correction coefficient is substituted for the correction coefficients for other lines.

According to a fourth method, a range for shading correction is limited to a range of reading the image, thus reducing the memory capacity. Since the reading range upon reading the film original is narrower than that upon reading the sheet original in many cases, the correction range is limited to the reading range, thus reducing the memory capacity.

Further, two or more methods of the first to fourth methods may be combined.

In the image reading apparatus using the contact image sensor according to the present invention, the area light source uses the LED device and the R-, G-, and B-LED chips can sequentially be switched. Therefore, the image can be read from the film original.

Advantageously, costs and power consumption are reduced because the area light source of the present invention uses the LED device.

What is claimed is:

1. An image reading apparatus for reading a light-transmission original, comprising
   an area light source for irradiating light to said light-transmission original, comprising a light guide plate in which at least one of an LED device including red-, green-, and blue-LED chips is arranged to a peripheral side surface thereof,
   wherein the area light source includes features which scatter light from the LED device to provide substantially uniform illumination by each of the red-, green-, and blue-LED chips over an area that includes at least one frame of the light-transmission original.

2. An image reading apparatus for reading a light-transmission original, comprising:
   a case the upper surface thereof having a transparent plate on which said light-transmission original is placed;
   a contact image sensor provided in said case, which can be reciprocatedly moved for reading and scanning, said contact image sensor comprising an erect unity-magnification optical system and a line sensor; and
   an area light source for irradiating light to said light-transmission original, provided upstream of said transparent plate, comprising a light guide plate in which at least one of an LED device including red-, green-, and blue-LED chips is arranged to a peripheral side surface thereof,
   wherein the area light source includes features which scatter light from the LED device to provide substantially uniform illumination by each of the red-, green-, and blue-LED chips over an area that includes at least one frame of the light-transmission original.

3. An image reading apparatus according to claim 2, wherein simultaneously with an operation for reading and scanning by said contact image sensor, the red-, green-, and blue-LED chips are sequentially lit on.

4. An image reading apparatus according to claim 3, further comprising:
   a linear light source for irradiating light to a sheet original in said contact image sensor,
   wherein said area light source is incorporated in an original cover, and
   the light-transmission original is read by lighting on said area light source and the sheet original is read by lighting on said linear light source.

5. An image reading apparatus according to claim 4, wherein the dimension of said area light source is equal to the sum of an integer multiple of the dimension of one frame of the light-transmission original and spaces between frames.

6. An image reading apparatus according to claim 4, further comprising:
   a light-on circuit which is shared to light on said area light source and said linear light source; and
   a switch is switched to transmit an output of said light-on circuit to said linear light source or said area light source.

7. A shading correcting apparatus for correcting the variation of sensitivities of a line sensor and the variation of illuminances of an area light source in an image reading apparatus according to claim 2, comprising:
   a correction coefficient calculating unit for calculating a correction coefficient for electrical weighting so that an output value of an electrical signal outputted by said line sensor becomes constant, by lighting on any for red-, green-, and blue-LED chips in said area light source, scanning an image in a state in which, on the transparent plate, there is no original or a semitransparent film is placed, and receiving light from said area light source;
   a memory for storing said correction coefficient for a 2-dimensional position of each pixel in said line sensor and the light emission of the red-, green-, and blue-LED chips; and
   a shading correction unit for reading the correction coefficient from said memory upon actually reading an image and multiplying the output value of the electrical signal of each pixel, which is outputted by said line sensor, to the correction coefficient corresponding to each pixel.

8. A shading correcting apparatus for correcting the variation of sensitivities of a line sensor and the variation of illuminances of an area light source in an image reading apparatus according to claim 2, comprising:
   a correction coefficient calculating unit for calculating a correction coefficient for electrical weighting so that an output value of an electrical signal outputted by said line sensor becomes constant, by lighting on any for red-, green-, and blue-LED chips in said area light source, scanning an image in a state in which, on the transparent plate, there is no original or a semitransparent film is placed, and receiving light from said area light source;
   a memory for storing said correction coefficient for a 2-dimensional position of each pixel of said line sensor and the light emission of one or two chips of the red-, green-, and blue-LED chips an setting the correction coefficient stored for one or two LED chips to be a correction standard for the emission of the remaining LED chip; and a shading correcting unit for reading the correction coefficient from said memory upon actually reading an image and multiplying the output value of the electrical signal of each pixel, which is outputted by said line sensor, to the correction coefficient corresponding to each pixel.

9. A shading correcting apparatus according to claim 7 or 8, wherein one correction coefficient calculated by said correction coefficient calculating unit is stored in said memory as one representative correction coefficient of one or more pixels in an adjacent pixel area.

10. A shading correcting apparatus according to claim 9, wherein the number of pixels which is one or more is constant every said pixel area.

11. A shading correcting apparatus according to claim 9, wherein the number of pixels which is one or more is different depending on said pixel area.

12. A shading correcting apparatus according to claim 11, wherein an area having a small variation of output values of electrical signals of pixels has a larger number of said adjacent pixels to which one representative correction coefficient is used, as compared with an area having a large variation of output value of electrical signals of pixels.

13. A shading correcting apparatus according to claim 7 or 8, wherein a correction coefficient of one pixel on a predetermined line, which is calculated by said correction coefficient calculating unit, is stored in said memory as correction coefficients of all pixels, in a reading direction, which intersect with the pixel.

14. A shading correcting apparatus according to claim 7 or 8, wherein an image reading range is limited and the correction coefficients of pixels are stored in said memory.

15. A shading correcting apparatus according to claim 7 or 8, wherein said correction coefficient is a reciprocal number of the output value of the electrical signal, a value obtained by multiplying the reciprocal number of the output value of the electrical signal by a constant, or a value obtained by multiplying the reciprocal number of the output value of the electrical signal by an average of the electrical signals of pixels.

16. A shading correcting apparatus according to claim 7 or 8, wherein said semitransparent film is a base film as a base material of the read film.

17. A shading correcting method for correcting the variation of sensitivities of a line sensor and the variation of illuminances off an area light source in an image reading apparatus according to claim 2, comprising the steps of:

lighting on any of red-, green-, and blue-LED chips in said area light source, scanning an image by said contact image sensor in a state in which, on the transparent plate, there is no original or semitransparent film is placed, and receiving light from said area light source and outputting an electrical signal by said line sensor;

calculating a correction coefficient for electrical weighting so that an output value of the electrical signal outputted by said line sensor becomes constant; and storing said correction coefficient for a 2-dimensional position of each pixel in said line sensor and the light emission of the red-, green-, and blue-LED chips and using the stored correction coefficient upon actually reading the image.

18. A shading correcting method for correcting the variation of sensitivities of a line sensor and the variation of illuminances off an area light source in an image reading apparatus according to claim 2, comprising the steps of:

lighting on any of red-, green-, and blue-LED chips in said area light source, scanning an image by said contact image sensor in a state in which, on the transparent plate, there is no original or semitransparent film is placed, and receiving light from said area light source and outputting an electrical signal by said line sensor;

calculating a correction coefficient for electrical weighting so that an output value of the electrical signal outputted by said line sensor becomes constant; and storing said correction coefficient for a 2-dimensional position of each pixel in said line sensor and the light emission of one or two LED chips of the red-, green-, and blue-LED chips as a correction standard and using the stared correction coefficient for correction upon actually reading the image.

19. A shading correcting method according to claim 17 or 18, wherein a correction coefficient of one pixel on a predetermined line, which is calculated in said correction coefficient calculating step, is stored in said storing step as correction coefficients of all pixels, in a reading direction, which intersect with the pixel.

20. A shading correcting method according to claim 17 or 18, wherein an image reading range is limited and the correction coefficients of pixels are stored in said storing step.

21. A shading correcting method according to claim 17 or 18, wherein said correction coefficient is a reciprocal number of the output value of the electrical signal, a value obtained by multiplying the reciprocal number of the output value of the electrical signal by a constant, or a value obtained by multiplying the reciprocal number of the output value of the electrical signal by art average of the electrical signals of pixels.

22. A shading correcting method according to claim 17 or 18, wherein said semitransparent film is a base film as a base material of the read film.

23. A shading correcting method according to claim 17 or 18, wherein one correction coefficient calculated in said correction coefficient calculating step is stored in said storing step as representative correction coefficient of one or more pixels in an adjacent pixel area.

24. A shading correcting method according to claim 23, wherein the number of pixels which is one or more is constant every said pixel area.

25. A shading correcting method according to claim 23, wherein the number of pixels which is one or more is different depending on said pixel area.

26. A shading correcting method according to claim 25, wherein an area having a small variation of output values of electrical signals of pixels has a larger number of said adjacent pixels to which one representative correction coefficient is used, as compared with an area having a large variation of output value of electrical signals of pixels.

27. An area light source for irradiating light to a light-transmission original in an image reading apparatus for reading the light-transmission original, comprising:

a light guide plate for scattering or reflecting light on a rear surface thereof;

a white bottom plate for covering the rear surface of said light guide plate;

a white case frame for covering a side surface of said light guide plate;

a scattering sheet for covering an upper surface of said light guide plate; and at least one LED device including red-, green-, and blue-LED chips, which is arranged at a peripheral side surface of said light guide plate, wherein the area light source includes features which scatter light from the LED device to provide substantially uniform illumination by each of the red-, green-, and blue-LED chips over an area that includes at least one frame of the light-transmission original.

28. An area light source for irradiating light to a light-transmission original in an image reading apparatus for reading the light-transmission original, comprising:

a light guide plate for scattering or reflecting light on a rear surface thereof;

a white case for covering the rear surface and a side surface of said light guide plate;

a scattering sheet for covering an upper surface of said light guide plate; and at least one LED device including red-, green-, and blue-LED chips, which is arranged at a peripheral side surface of said light guide plate, wherein the area light source includes features which scatter light from the LED device to provide substantially uniform illumination by each of the red-, green-, and blue-LED chips over an area that includes at least one frame of the light-transmission original.

29. An area light source according to claim 27 or 28, wherein a dot pattern of a light scatter is formed on a rear surface of said light guide plate.

30. An area light source according to claim 29, wherein said dot pattern is a circular dot pattern.

* * * * *